Aug. 10, 1926.

W. S. HUKILL ET AL 1,595,939

FLUID PRESSURE PRIME MOVER

Filed Jan. 19, 1923

Inventor
William S Hukill
George W. Wyman

By
[signature], Attorney

Patented Aug. 10, 1926.

1,595,939

UNITED STATES PATENT OFFICE.

WILLIAM S. HUKILL AND GEORGE W. WYMAN, OF WILMINGTON, DELAWARE.

FLUID-PRESSURE PRIME MOVER.

Application filed January 19, 1923. Serial No. 613,669.

This invention relates to fluid pressure actuated prime movers and has for its principal object the provision of an engine in which reciprocatory motion is imparted to a piston rod by a compound piston so arranged and constructed as to operate as a differential piston on one stroke of its cycle and to have one portion thereof balanced on the other stroke so that it then functions as a simple piston, the advantages attending this arrangement and mode of operation being that it is necessary to exhaust the fluid from but one side of the piston, and that single inlet and exhaust ports suffice for the proper functioning of the engine.

Another object of the invention is the provision of a novel piston-actuated valve for controlling the inlet and exhaust ports.

With the above and other objects in view, our invention consists in the improved fluid pressure prime mover illustrated in the accompanying drawings, described in the following specification, and particularly claimed, and in such variations and modifications thereof as will be obvious to those skilled in the art to which our invention relates.

In the drawings accompanying and forming a part of this specification, and wherein the preferred embodiment of our invention is illustrated:—

Figure 1:
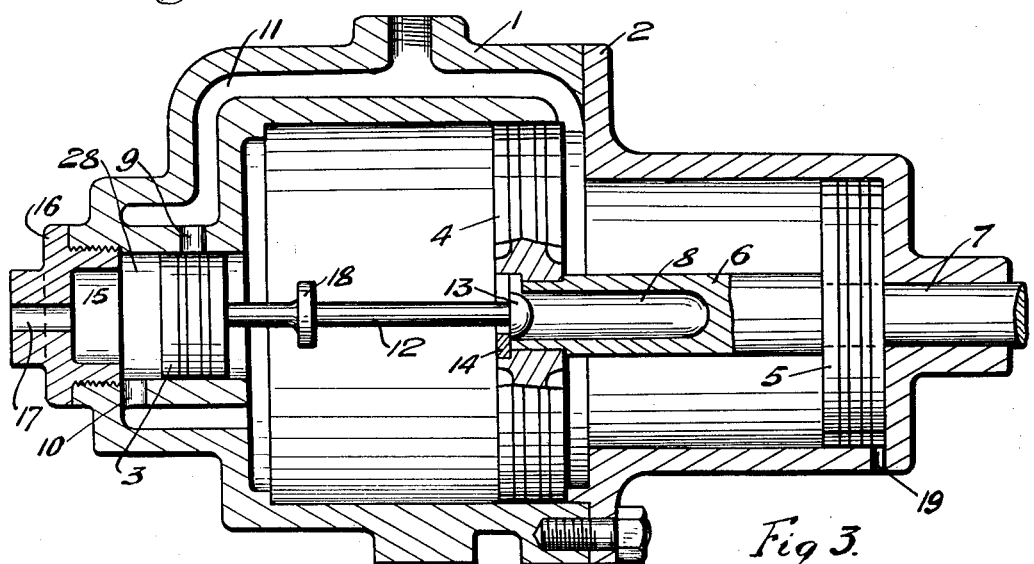
Figure 1 is a side view in cross section of the piston and cylinder of an engine constructed according to our invention with the exhaust port open.
Figure 3:
Figure 3 is a detail view partly in section of the engagement plate for operating the valve.

Referring now in detail to the several figures, the numerals 1 and 2 refer to castings which when bolted together as shown in Figure 1 form a cylinder of two diameters in which the differential piston reciprocates. This piston has a head 4 of large diameter fitting within the casting 1, having two working faces, and a head 5 of smaller diameter fitting the bore within the casting 2 and having a single working face on the side next to the larger piston head. These heads are rigidly secured together in any suitable manner, for instance by the stem 6. A piston rod 7 passes through an axial opening in the casting 2 and is connected to any suitable power transmitting mechanism not shown. The stem 6 is formed with a bore 8 extending from the end adjacent the piston head 4 to an intermediate point within said stem. The object of this bore will be presently explained.

Figure 2:
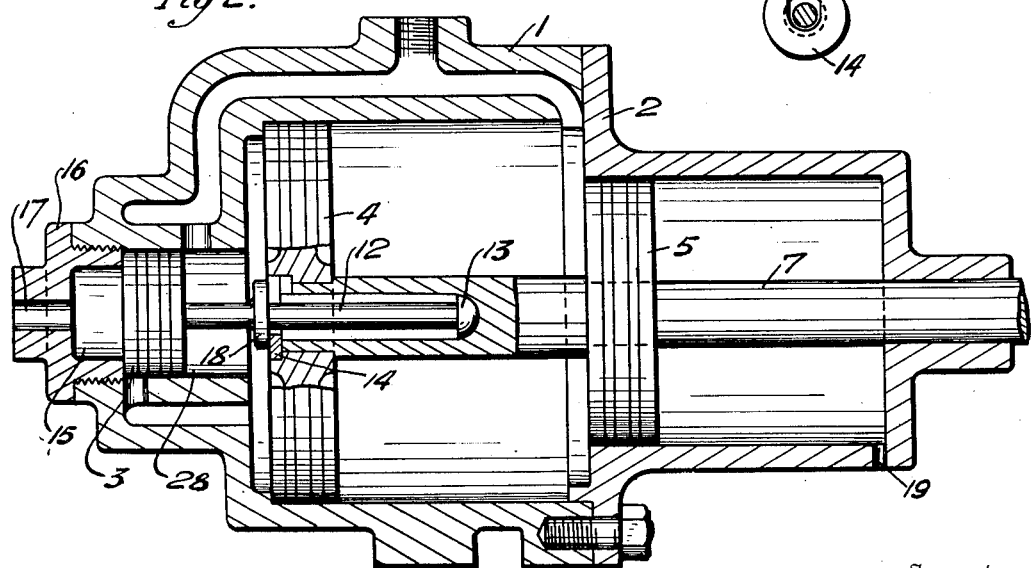
Figure 2 is a similar view showing the inlet port open.

The casting 1 is counter-bored to form a valve chamber 28 having inlet and exhaust ports 9 and 10 respectively. The inlet port is connected by means of a passage 11 with a source of fluid pressure not shown and with the cylinder chamber at a point on the side of the piston head 4 remote from the valve chamber. Within the latter is a piston valve 3 having a range of travel which causes it to alternately open and close the inlet and exhaust ports. When said valve is in the position shown in Figure 2 the inlet port communicates with the cylinder chamber on that side of the piston 4 adjacent the valve chamber, while, as stated before, the inlet passage 11 communicates with said cylinder chamber on the opposite side of the piston 4, the latter being, at the time, balanced. The piston head 5 at such time provides the only working face for the differential piston, which is forced outwardly by the fluid pressure within the cylinder chamber reciprocating the piston rod 7 in an outward direction, the outer face of said piston head being open to atmospheric pressure through the vent 19. The valve 3 is furnished with a stem 12 fitting within the bore 8 of the stem of the differential piston and having an enlarged head 13 at its lower end. A slotted plate 14 which is preferably made of a durable material is secured over the outer end of the bore 8, partly throttling the latter and preventing the escape of the head 13. When the differential piston approaches the outer end of its stroke under pressure against the working face of the piston head 5, as heretofore explained, the plate 14 engages the head 13 moving the piston valve 3 to a position in which it closes the inlet port but opens the exhaust port. The latter is then connected to the cylinder chamber on the adjacent side of the piston head 4, and with an exhaust chamber 15 formed within a removable gland 16 and having access to the atmosphere by means of the passage 17. When the valve is in this position a way is afforded for the escape of the fluid pressure from one face of the piston 4 permitting the pressure between the adjacent working faces of the piston heads 4 and 5 to act differentially upon the larger of these piston heads driving the piston inwardly toward the valve chamber. When a certain point has been reached near the top of the stroke the plate 14 co-acts with a collar 18 which may be an integral part of the stem 12 moving the valve 3 to a position in which the exhaust port is closed and the intake port opened. This automatic sequence of functioning continues during the operation of the engine.

The advantages attending our invention are that there is a full power impulse on both strokes of the piston although the only single admission and exhaust port, and a single valve are required, thus considerably simplifying the construction of the engine and minimizing the number of parts. A further advantage is found in the piston operated valve mechanism through which the necessity of outside valve gear is altogether avoided and the operation of the valve rendered entirely automatic and responsive to the position of the piston within the cylinder.

Obviously, changes in the details of construction may be made, without departing from the spirit of the invention and we do not wish to limit ourselves to any particular form of arrangement of parts.

Having described our invention what we claim as new and desire to secure by Letters Patent, is:—

A fluid pressure actuated prime mover including a cylinder of two diameters, a differential piston therein comprising a plurality of piston heads of different diameters, the hollow piston rod rigidly connecting said piston heads, said cylinder being provided with ports for admitting fluid under pressure to the space between said piston heads, and to that part of the cylinder outside the piston adjacent the larger piston head, said outside part of the cylinder being provided with an exhaust port, a valve in said outside part of the cylinder controlling said admission and exhaust ports, said valve presenting a smaller effective area to the pressure within said outside part than the area of said larger piston head, a stem for said valve extending into said hollow piston rod provided with an enlarged head on the end thereof and a collar at an intermediate point outside of said hollow piston rod, and valve operating means associated with said hollow piston rod and engageable with said head and collar respectively at the extreme positions of the stroke of the piston.

In testimony whereof we have hereunto set our hands.

WILLIAM S. HUKILL.
GEORGE W. WYMAN.